United States Patent [19]
Tanaka et al.

[11] Patent Number: 5,195,383
[45] Date of Patent: Mar. 23, 1993

[54] STEERING TORQUE DETECTING DEVICE

[75] Inventors: Akio Tanaka, Toyohashi; Fumiaki Murakami, Kariya; Hiroshi Tsuda, Obu; Tsutomu Kamizono, Obu; Kazunori Shimokawa, Tokai; Kanji Takeuchi, Gamagori, all of Japan

[73] Assignee: Nippondenso Co., Ltd., Kariya, Japan

[21] Appl. No.: 624,216

[22] Filed: Dec. 7, 1990

[30] Foreign Application Priority Data

Dec. 8, 1989 [JP] Japan .................. 1-319482
Nov. 15, 1990 [JP] Japan .................. 2-310707

[51] Int. Cl.$^5$ ............................. G01L 3/02
[52] U.S. Cl. ..................... 73/862.325; 73/862.326
[58] Field of Search ......... 73/862.33, 862.34, 862.325, 73/862.326, 862.321

[56] References Cited

U.S. PATENT DOCUMENTS

| | | | |
|---|---|---|---|
| 4,492,906 | 1/1985 | Goto et al. | 73/862.34 |
| 4,503,713 | 3/1985 | Obayashi et al. | 73/862.34 |
| 4,592,241 | 6/1986 | Obayashi et al. | 73/862.34 |
| 4,592,241 | 6/1986 | Obayashi et al. | 73/862.328 |

FOREIGN PATENT DOCUMENTS

| | | |
|---|---|---|
| 2214223 | 8/1973 | Fed. Rep. of Germany ... 73/862.04 |
| 63-78876 | 4/1988 | Japan . |
| 64-36567 | 2/1989 | Japan . |

Primary Examiner—Michael T. Razavi
Assistant Examiner—Elizabeth L. Shopbell
Attorney, Agent, or Firm—Cushman, Darby & Cushman

[57] ABSTRACT

A steering torque is transmitted from a steering wheel side rotary member to a steering shaft side rotary member through a plurality of elastic bodies, when a steering wheel is turned. The elastic bodies are provided around a rotational center of a steering shaft which bending parts. A relative rotation produced between the steering wheel side rotary member and the steering shaft side rotary member is detected by detecting coils, because the detecting coils detect the change of the reluctance of the magnetic circuit of the rotary members and the detecting coil.

13 Claims, 13 Drawing Sheets

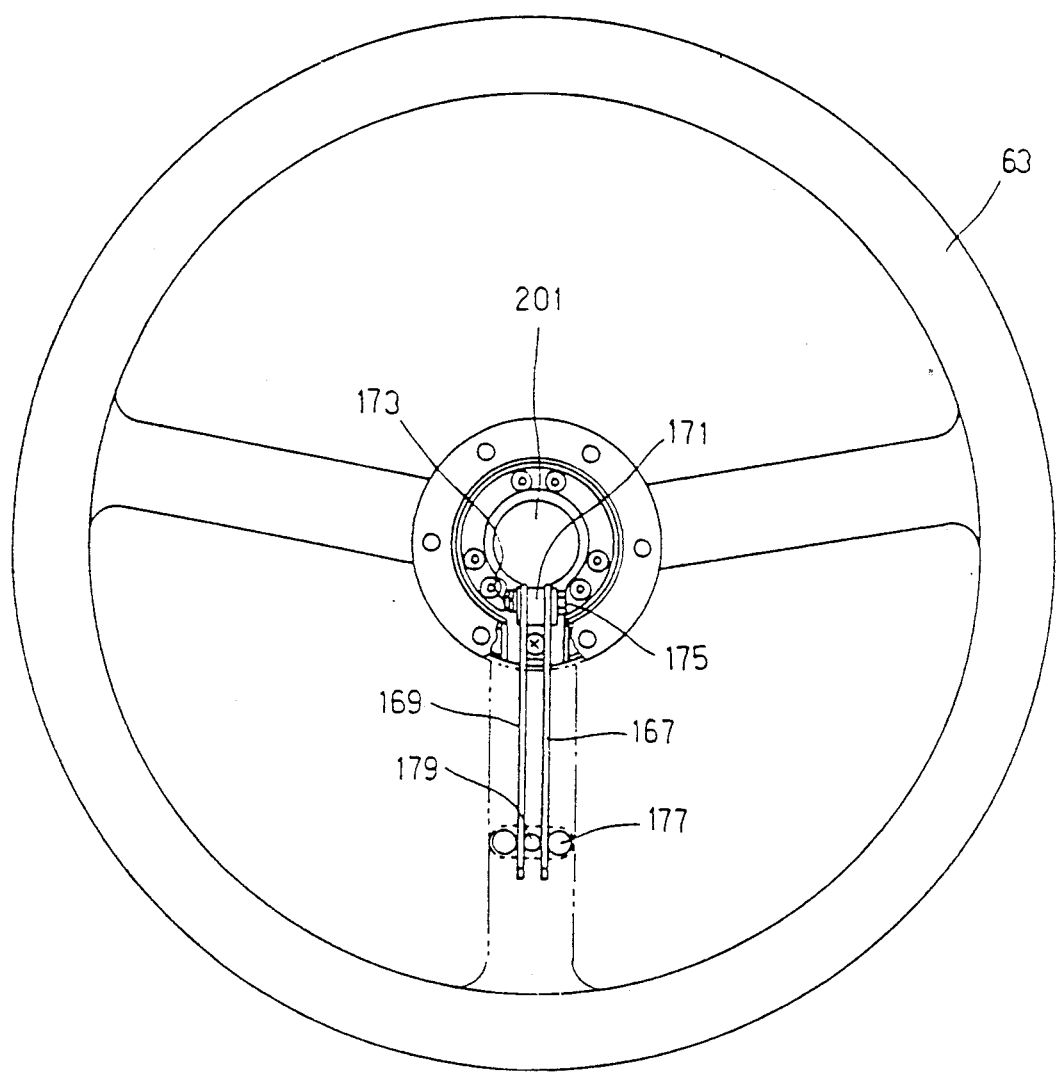

STEERING TORQUE DETECTING DEVICE

BACKGROUND OF THE INVENTION

This invention relates to a steering torque detecting device for detecting a steering torque caused by turning a steering wheel.

A conventional steering torque detecting device as shown in Japanese Patent Laid-open 63-78876 detects the reluctance produced by the relative rotation between the driving shaft and the steering shaft which are connected by a torsion.

In this related art, the relative rotation between the driving shaft and the steering shaft is detected as the steering torque. The torsion bar must be made smaller (narrower) than the driving shaft and the steering shaft to obtain a high sensitivity of torque detecting. In this case, the smaller (narrower) torsion bar can achieve an easy production of the relative rotation results in the high sensitivity of the torque detecting. This smaller (narrower) torsion bar, on the other hand, produced the low rigidity of axial direction and the radial direction causing the low durability. In order to increase the rigidity, some bearings have been used. Such bearings, however, cause hysteresis of the torque detecting.

SUMMARY OF THE INVENTION

An object of the present invention is to provide a steering torque detecting device which can achieve a high sensitivity of torque detecting as well as a high rigidity of the axial direction and radial direction. Further object of the present invention is to provide a detecting device having a shock absorbing function.

In the present invention, plural torque transmitting means which have bending parts connect a steering wheel side rotary means and a steering shaft side rotary means. Since bending parts of the plural torque transmitting means can be deformed, a relative rotation is caused between the steering wheel side rotary means and the steering shaft side rotary means. Therefore, the reluctance of the magnetic circuit including the rotary means is changed. The change of the reluctance is detected by a detecting means. The steering torque is transmitted by a plurality of torque transmitting means having bending parts, elastic leaf springs only bent without its torsion. Since there is no torsion for elastic leaf springs, high durability of the steering torque transmitting means can be achieved. Furthermore, a plurality of torque transmitting means are provided around the rotational center of the steering shaft, so the rigidity of the axial direction and the radial direction becomes higher. A plurality of torque transmitting means can be thin to make the torque detecting sensitive without reducing the rigidity of the axial direction and the radial direction because the rigidity is guaranteed by a plurality of torque transmitting means.

BRIEF DESCRIPTION OF THE THE DRAWINGS

FIG. 31 is a schematic view showing the fifth embodiment of the present invention;

Figure 33A:
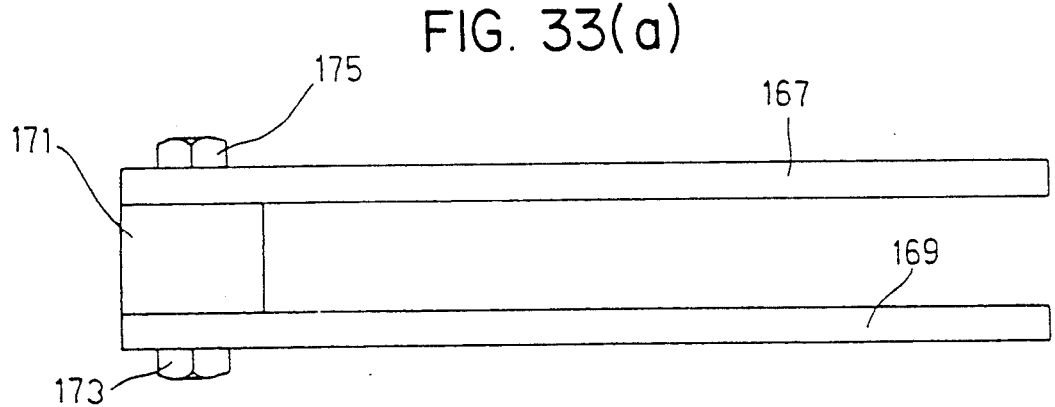

FIG. 33(a) and (b) are schematic views to explain about the torque transferring means in the fifth embodiment of the present invention.

DETAILED DESCRIPTION OF THE EMBODIMENTS

Figure 1:
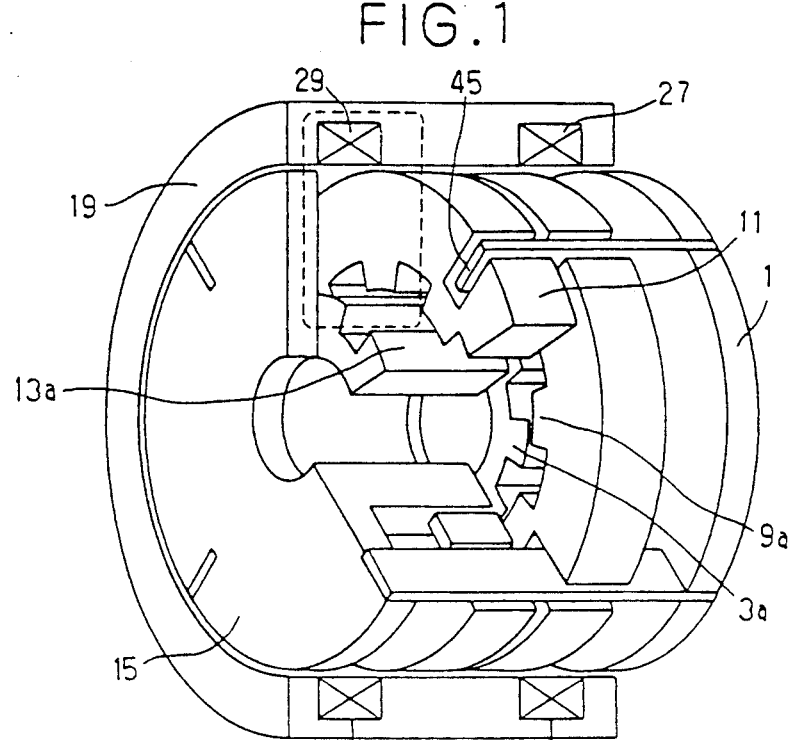
FIG. 1 is a schematic view showing the first embodiment of the present invention.

As shown from a schematic view of the first embodiment of the present invention(FIG. 1), a plurality of elastic leaf springs 45 as a torque transferring means are merged into notches formed in a first supporting plate 1 as a steering wheel side rotary means and a second supporting plate 15 as a steering shaft side rotary means. These elastic leaf springs 45 are located in such a manner that a longitudial direction thereof are coincident with a connecting direction of the first supporting plate 1 and the second supporting plate 15, and is provided at symmetrical position each other. A first inner gear 3a and a first outer gear 11 are made by magnetic material (such as iron), and rotate with the first supporting plate 1. A second inner gear 13a and a second outer gear 9a rotate with the second supporting plate 15. A housing 19 is fixed to an outer body of an automobile, and coil 27 and 29 as a detecting means are equipped thereon. Both of the coils 27 and 29 are comprised by a winding of a pair of an input conducting wire and an output conducting wire. The output connecting wire of the coils 27 and 29 are connected to an electric control unit (ECU) 50. When a current is supplied to the coils 27 and 29, the coil 29 generates the magnetic circuit shown in FIG. 1 as dotted line through an outer gear 11a and an inner gear 13a, and also detects the magnetic field of the magnetic circuit. The coil 27 works the same as the coil 29 making a magnetic circuit through inner gear 3a and outer gear 9a. When a relative rotation between the first supporting plate 1 and the second supporting plate 15 is produced, the coils 27 and 29 detect the change of the magnetic field produced by the relative rotation.

Figure 2:
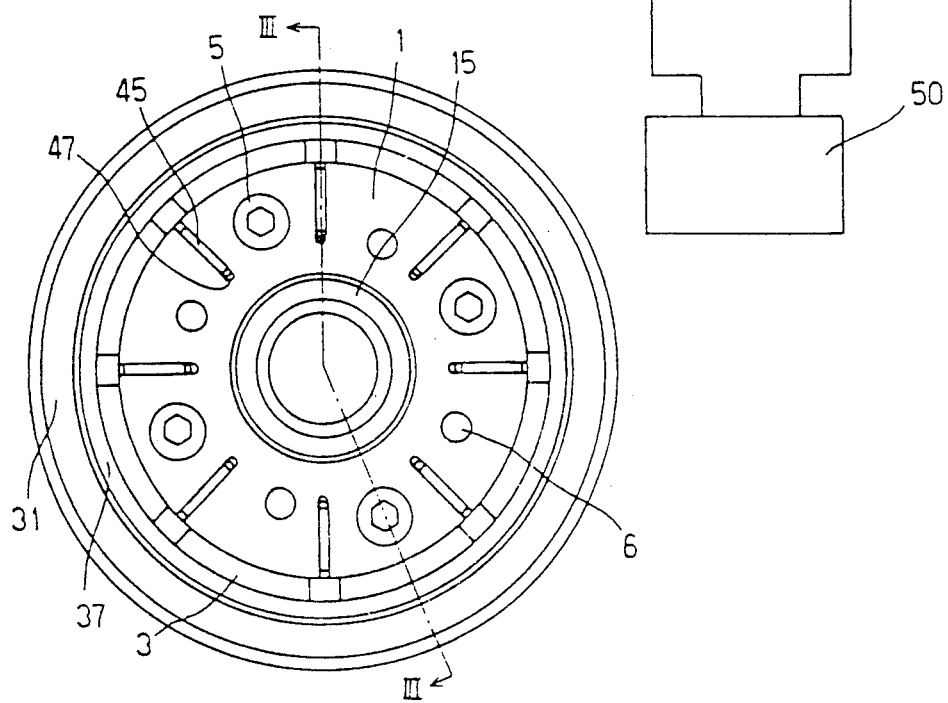
FIG. 2 is a front view of the first embodiment present invention.
Figure 3:
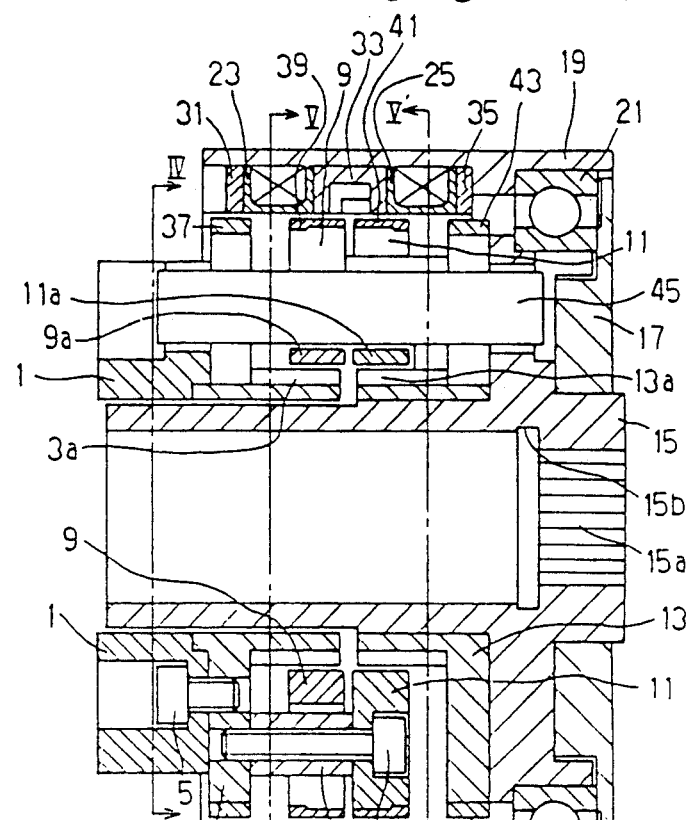
FIG. 3 is a sectional view taken along with III—III line of FIG. 2.

The first embodiment of the present invention will be described more precisely by using FIG. 2 to FIG. 7. FIG. 2 is a front view of the steering torque detecting device of the first embodiment. The first supporting plate 1 as the steering wheel side rotary means is fixed to a gear 3 which is made of iron by a bolt 5. The first supporting plate 1 has some tapped holes 6 to fix the first supporting plate 1 to the steering wheel by screws (not shown). Elastic leaf springs 45 as the torque transferring means is inserted into the notches 47 which are formed in the first supporting plate 1. FIG. 3 is a sectional view taken along with III—III line of FIG. 2. Iron gear 11 is connected to a steering side gear 3 by bolt 7 via a spacer 8. The first supporting plate 1, the gear 3 and the iron gear 11 rotate together. The gear 3 has inner gear 3a on the outer surface, the gear 11 also has outer gear 11a on the inner surface. The second supporting plate 15 has a spline 15a and a groove 15b. The second supporting plate 15 rotates with the steering shaft since the same 15 is fixed to the steering shaft via the spline 15a. A supporting ring 17 is merged into the second supporting plate 15. This supporting ring 17 is equipped to housing 19 via a bearing 21. A gear 13 is fixed to the second supporting plate 15 by bolt (not shown). A gear 9 is fixed to the gear 13 via the spacer like(not shown) as the same manner that the gear 3 is fixed to the iron gear 11. Therefore, the second supporting plate 15, the gear 13 and the gear 9 rotate together. The inner gear 3a and the outer gear 9a face each other with a small gap. The inner gear 13a and the outer gear 11a also face each other with the small gap. A first outer ring 37 made of iron is fixed to the gear 3 to uniform the air gap between the first outer ring 37 and the iron ring 31, so that the strength of the magnetic coupling between the gear 3 and the coil 27 is stabilized. A second outer ring 39 is fixed to gear 9, a third outer ring 41 is fixed to gear 11, a fourth outer ring 43 is fixed to gear 13 to stabilize the strength of the magnetic coupling. A bobbin 23 made of resin covers the coil 27 as a detecting means. A bobbin 25 made of resin covers the coil 29. An iron ring 33 is provided between the bobbins 23 and 25. Iron rings 31 and 35 are provided at the end of the bobbins 23 and 25 respectively. When a current is provided to the input conducting wire of the coil 27, one magnetic circuit through the ring 31, the first outer ring 37, the gear 3, the inner gear 3a, the outer gear 9a, the gear 9, the second outer ring 39 and the ring 33 is generated. When a current is supplied to the input conducting wire of the coil 29, another magnetics circuit through the ring 33, the third outer ring 41, the gear 11, the outer gear 11a, the inner gear 13a, the gear 13, the fourth outer ring 43 and the ring 35 is generated. A pair of coils 27 and 29 work as a differential transformer to compensate the drift of the output value of one of the coils 27 and 29. One end of elastic leaf springs 45 made of stainless steel is fixed to the first supporting plate 1 and another end thereof is fixed to the second supporting plate 15. The bending parts of the elastic leaf springs 45 produce the relative rotation between the first supporting plate 1 and the second supporting plate 15.

Figure 4:
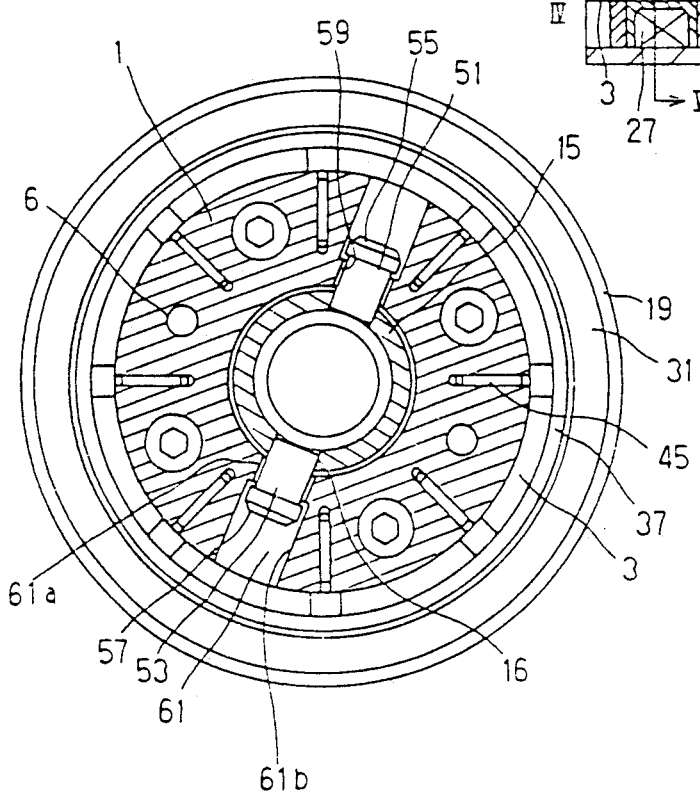
FIG. 4 is a sectional view taken along with IV—IV line of FIG. 3.

FIG. 4 is a sectional view taken along with IV—IV line of FIG. 3. (Columnar shaped pins 51 and 53 with a step work as a rotation angle restricting means.) The head of the pins 51 and 53 have taper portions 55 and 57, and pins 51 and 53 are inserted in notches 61 and 16. Since there are the small gap 59 between the narrower part 61a of the notch 61 and pins 51 or 53, the first supporting plate 1 and the second supporting plate 15 can rotate within 1.5° in the clockwise direction or counterclockwise direction. These pins 51 and 53 can protect from a damage caused by the over bending of the bending part of the elastic leaf spring 45. The wider part 61a of the notch 61 and pins 51 and 53 work as a stopper to protect from releasing of the first supporting plate 1 and the second supporting plate 15 even if all elastic leaf springs 45 were broken.

Figure 5:
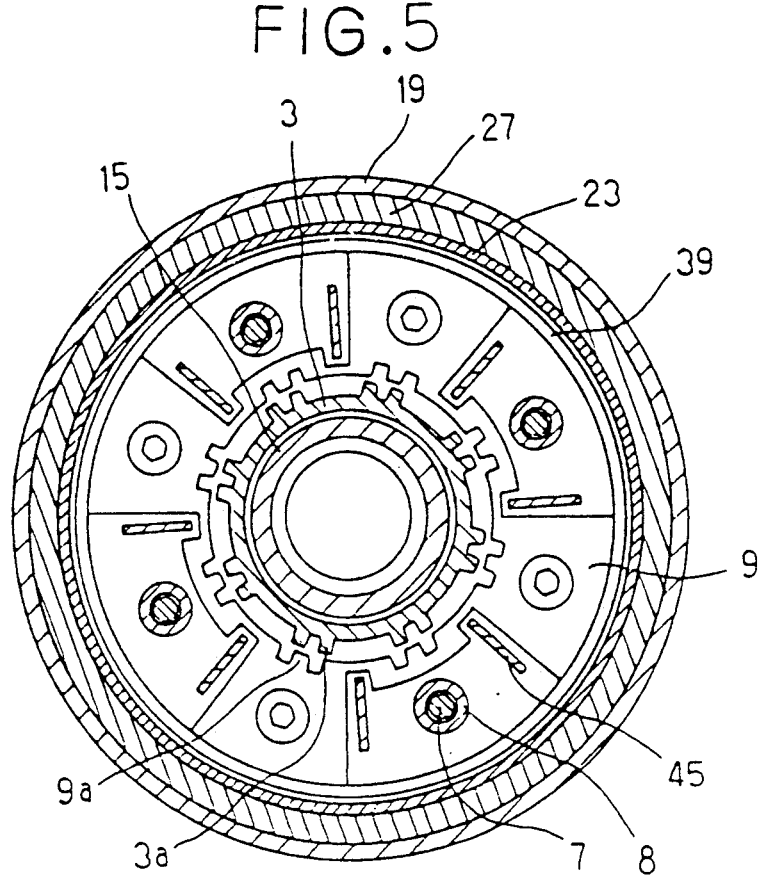
FIG. 5 is a sectional view taken along with V—V line of FIG. 3.

FIG. 5 is a sectional view taken along with V—V line and V'—V' line of FIG. 3, because the sections of V—V and V'—V' are the same. As shown in FIG. 5, the inner gear 3a provided at the outer part of the gear 3 faces to the outer gear 9a provided at the inner part of the gear 9 with a small gap. The change of the distance between the inner gear 3a and the outer gear 9a causes the change of the reluctance of the magnetic circuit.

Figure 6:
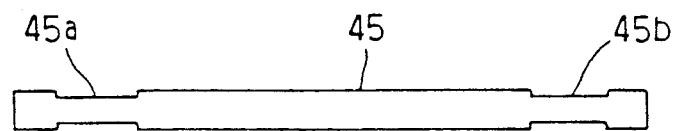
FIG. 6 is a front view showing torque transmitting means of the first embodiment of the present invention.
Figure 7:
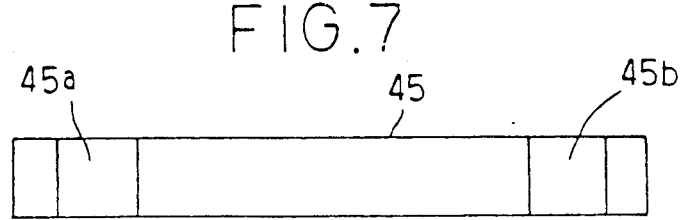
FIG. 7 is a side view of the torque transferring means of the first embodiment of the present invention.

FIG. 6 is a side view of the elastic leaf spring 45. FIG. 7 is a front view of the elastic leaf spring 45. As shown in FIGS. 6 and 7, recesses 45a and 45b inserted in the notches 47 are formed at both ends of the elastic leaf springs 45.

Figure 8:
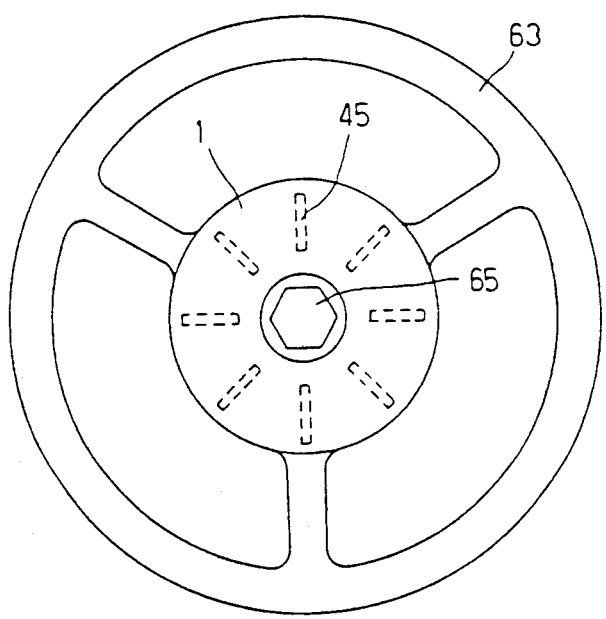
FIG. 8 is a schematic view showing the application example of the first embodiment applied to the steering wheel.
Figure 9:
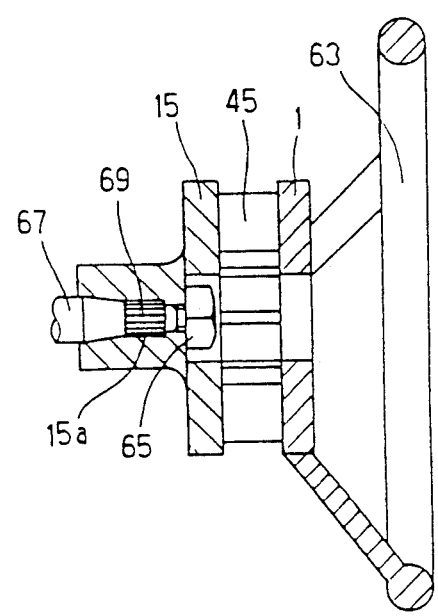
FIG. 9 is a schematic cross-sectional view of FIG. 8.

FIGS. 8 and 9 show the steering wheel 63 with the steering shaft side rotary means of the first embodiment. The spline 69 of the steering shaft 67 is connected to the spline 15a of the second supporting plate 15. The steering shaft 67 is attached to the second supporting plate 15 by nut 65.

The operation of the first embodiment will be described hereinafter. When a steering torque is added to the steering wheel 63, the first supporting plate 1 rotates with the steering wheel 63. When the steering torque is transmitted to the second supporting plate 15 through their elastic leaf springs 45, the relative rotation between the first supporting plate 1 and the second supporting plate 15 is occurred. The bending part of the elastic leaf spring 45 is bent by this relative rotation with its elasticity, and the distance between the inner gear 3a and the outer gear 9a or the inner gear 13a and the outer gear 11a is varied. When the distance between these inner gears 3a and 13a and outer gears 9a and 11a are changed, the reluctance of the magnetic circuit formed by the coil 27 or coil 29 is varied. The change of the reluctance is led to the electric control unit 50 by the output conducting wires of the coil 27 and the coil 29. The electric control unit 50 operates these output signals from the coils 27 and 29, and converts to the detected value of the steering torque.

In the first embodiment, the steering torque is transmitted by a plurality of elastic leaf springs 45 having the bending parts, the elastic leaf springs is only bent without any torsion. Since there is no torsion of the elastic leaf springs 45, high durability of the steering torque transferring means can be achieved. Furthermore, the elastic leaf springs 45 are provided around the rotational center of the steering shaft 67, so the rigidity of the axial direction and the radial direction becomes higher. Since the present invention uses the thin elastic leaf springs 45, the torque detection can be sensitive without reducing the rigidity of the axial direction and the radial direction, furthermore, the rigidity is guaranteed by a plurality of elastic leaf springs 45. In the first embodiment, elastic columns can be used instead of the elastic leaf springs 45.

Figure 10:
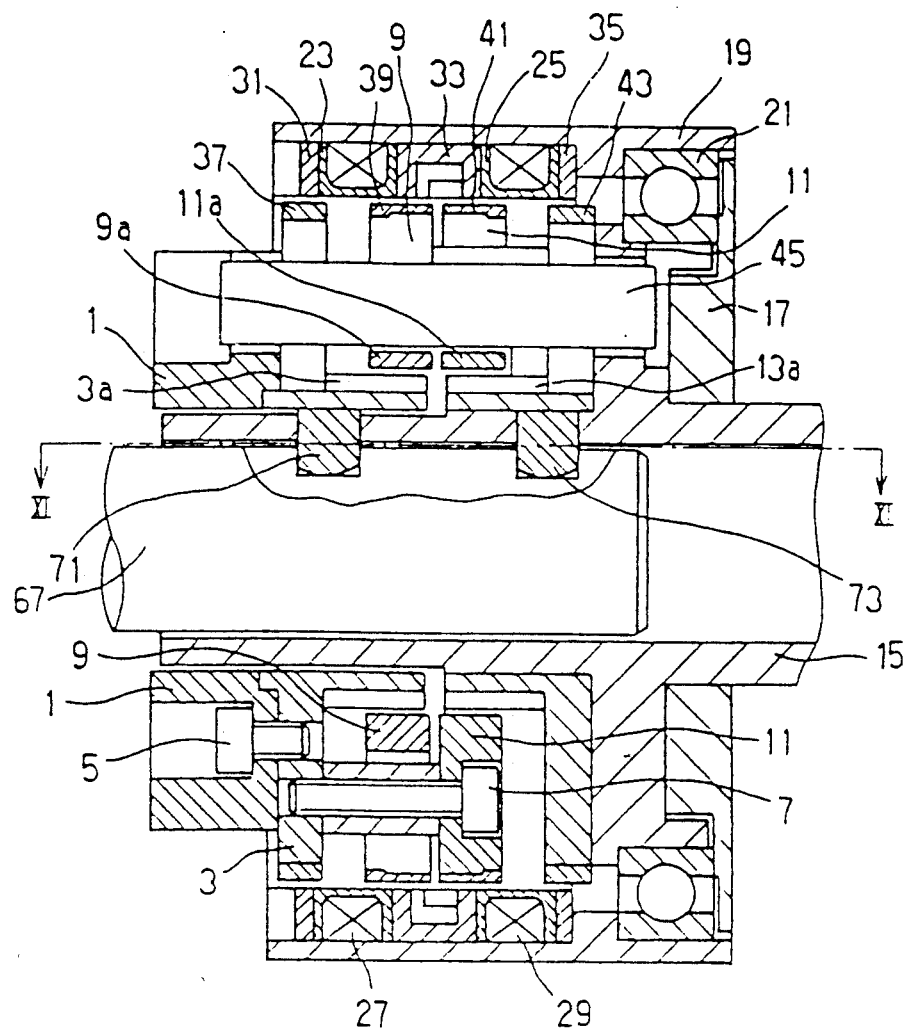
FIG. 10 is a sectional view of the second embodiment of the present invention.
Figure 11:
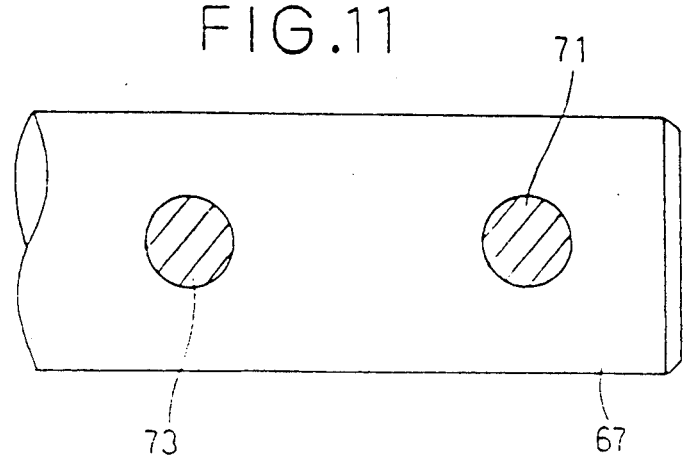
FIG. 11 is a sectional view taken along with XI—XI line of FIG. 10.

The second embodiment of the present invention is shown in FIGS. 10 and 11. FIG. 11 is a sectional view taken along with XI—XI line of FIG. 10. In this second embodiment, the same numeral as the first embodiment represents the same part described in the first embodiment, so that the explanation of those parts will be omitted. The difference between the first embodiment and the second embodiment is described hereinafter. In the second embodiment, the second supporting plate 15 and the steering shaft 67 connected by the resin pins 71 and 73 as a connecting means instead of the bolt. Since resin pins 71 and 73 have a certain strength, resin pins 71 and 73 are shared when a certain force is applied. When resin pins 71 and 73 are shared, the second supporting plate 15 and the steering shaft 67 are disconnected each other.

Since resin pins 71 and 73 are provided in this second embodiment, a shock absorbing system for absorbing the shock by sliding the steering wheel with the second supporting plate 15 against the steering shaft 67 is operated when resin pins 71 and 73 are shared by the shock.

Figure 12:
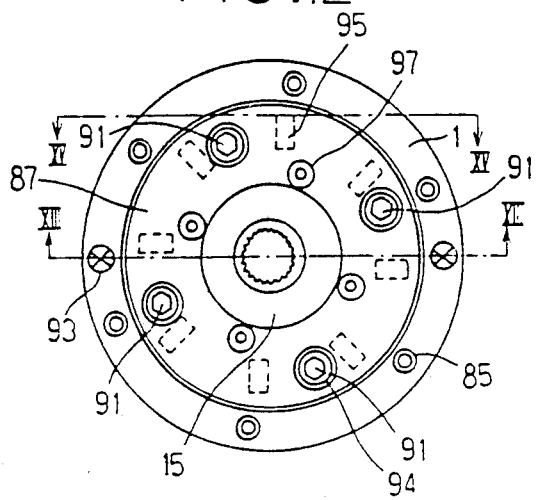
FIG. 12 is a plain view of the third embodiment of the present invention.
Figure 13:
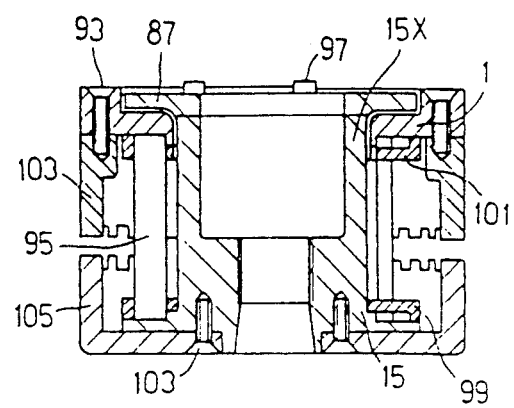
FIG. 13 is a sectional view taken along with XIII—XIII line of FIG. 12.
Figure 14:
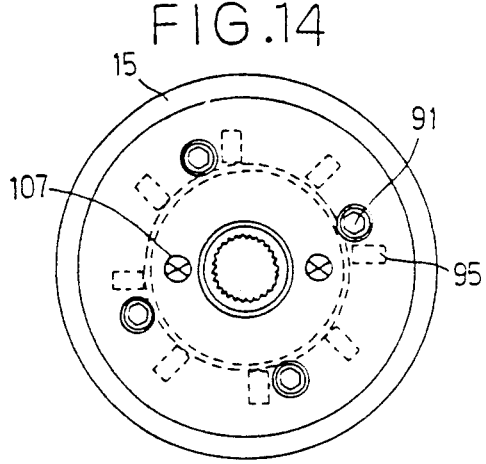
FIG. 14 is a bottom view of the third embodiment of the present invention.
Figure 15:
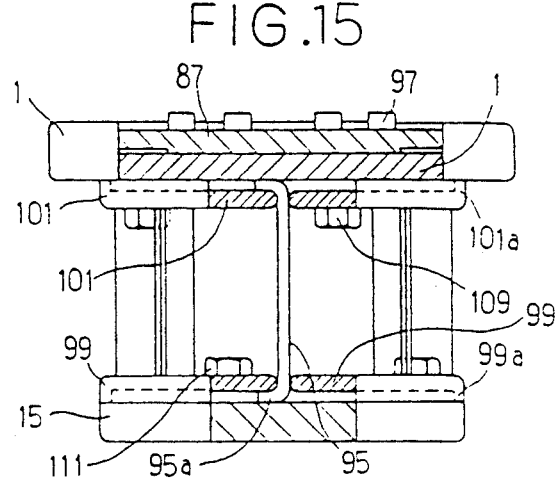
FIG. 15 is a sectional view taken along with XV—XV line of FIG. 12.
Figure 16:
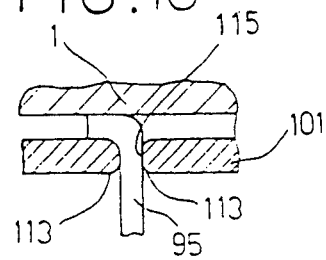
FIG. 16 is a part of a schematic enlarged view of FIG. 15.
Figure 17:
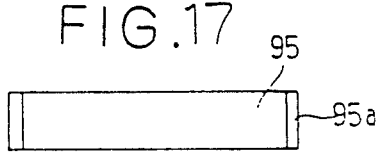
FIG. 17 and 18 are views showing the shape of the torque transferring means.
Figure 18:
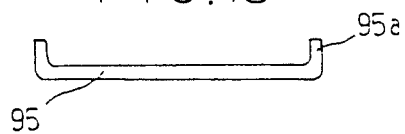
Figure 19:
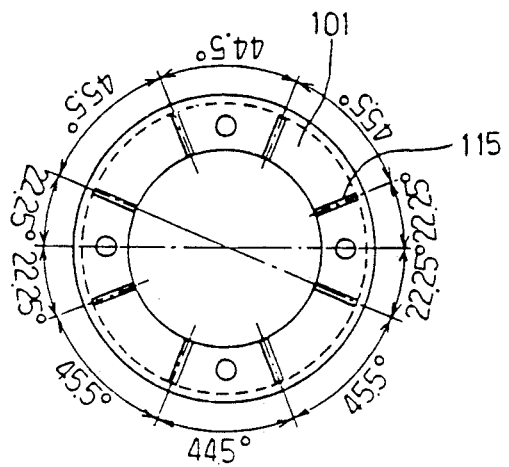
FIG. 19 is a plain view showing the upper stationary plate of the third embodiment.

Referring to FIGS. 12 to 19, the major parts of the third embodiment will be explained in detail. FIG. 12 is a plain view of a part of this embodiment other than the detecting means, which is viewed from the first supporting plate 1. FIG. 13 is a cross-sectional view taken along with XIII—XIII line of FIG. 12. FIG. 14 is a bottom view viewed from the second supporting plate 15. FIG. 15 is a sectional view taken along with XV—XV line of FIG. 12. As shown in FIGS. 17 and 18, the elastic plate 95 is a letter "C" shape, and the hook part 95a at both ends are fasten by merging into the groove 115 of an upper stationary plate 101 and a lower stationary plate 99. As shown in FIG. 16, round tapered faces 113 are provided at the four corners of the groove 115. The lower stationary plate 99 and the upper stationary plate 101 have peripheral projections 99a and 101a, respectively, as shown in FIG. 15, which restrain the movement of the elastic plate 95 in the radial direction. The second supporting plate 15 has a cylindrical part 15X forming a doughnut shape ring, and is fasten to the lower stationary plate 99 with hexagonal bolts 91 and nuts 111 at the lower ring portion, thereby the hook parts 95a of elastic plates 95 being clamped for fastening. In the same way, the first supporting plate 1 is fasten to the upper stationary plate 101 with hexagonal bolts 91 and nuts 109, thereby the hook parts 95a of elastic plates 95 being clamped and fastened. The tip of the cylindrical part 15X of the second supporting plate 15 is into the central portions of the upper stationary plate 101 and the first supporting plate 1 keeps a specified gap so as not to interfere therebetween. An upper disc 87 is secured to the cylindrical part 15 of the steering shaft side support part 15 by using pins 97. Stoppers 94 having a diameter larger than the external diameter of the hexagonal bolt 91 by a specified amount are provided on the upper disc 87 as shown in FIG. 12. Tapped holes 85 are provided on the first supporting plate 1 to fasten the first supporting plate 1 to the steering wheel by using bolts, etc. In FIG. 13, the steering wheel side rotary member 103 and the steering shaft side rotary member 105 are secured to the first supporting plate 1 and the second supporting plate 15 by using screws 93 and 103, respectively. When the elastic plate 95 are secured in the grooves 115 of the lower and upper stationary plates 99 and 101, for each elastic plate 95, the position of the groove 115 of the upper stationary plate 101 corresponding to the groove 115 of the lower stationary plate 99 is shifted by 1° from one another. Thereby, when fastened with the bolts 91 and nuts 109 and 111, the elastic plates 95 are provided with an initial strain by the shift of 1° of the corresponding grooves 115 of the lower and upper stationary plates 99 and 101. As a result, the slack between the elastic plates 95 and the lower and upper stationary plates 99 and 101 can be eliminated, and, further, the restoring force to the original position in an unloaded condition can be increased, eliminating the necessity for adjusting the zero point.

The operation of the third embodiment will be explained hereinafter. In FIG. 13, the steering shaft side rotary member 105, the lower stationary plate 99, and the upper disc 87 rotate simultaneously with the steering shaft. On the other hand, the first supporting plate 1, the upper stationary plate 101, and the steering wheel side rotary member 103 rotate integrally with the steering wheel 63. Thus, when the steering wheel 63 is turned the elastic plates 95 is interposed between the steering wheel 63 and the steering shaft 67, so that a relative rotation is occurred. The occurrence of this relative rotation causes the change of relative position between the square serrations of the steering wheel side rotary member 103 and the square serrations of steering shaft side rotary member 105. The change in the magnetic flux caused thereby is detected by the detecting means described in the first embodiment.

When the relative rotation between the first supporting plate 1 and the second supporting plate 15 is occurred, the elastic plate 95 is bent at the bending part described in the first embodiment.

Because the tapered portions 113 are formed as shown in FIG. 16 and because contact area of elastic plates 95 with the taper 113 is varied in accordance with the torque, the elastic plates 95 can be easily bent even when the torque is small (when the bend of elastic plate 95 is small), and the elastic plates 95 becomes hard to be bent when the torque becomes large (when the bend of elastic plates 95 is large) since the contact area of elastic plate 95 with the taper 113 becomes larger. Accordingly to the relative rotation is easily generated when the torque generated by turning the steering wheel is small, and the relative rotation is not easily generated when the torque is large. Since the torque is not proportional to the amount of the relative rotation, the required characteristic properties, that sensitive detection is necessary when torque is small and sensitive detection is not necessary when torque is large can be obtained.

Figure 20:
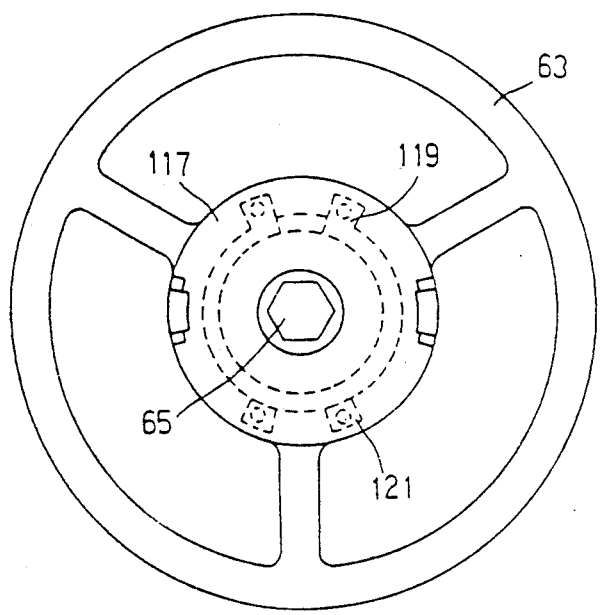
FIG. 20 is a schematic view showing the forth embodiment of the present invention.
Figure 21:
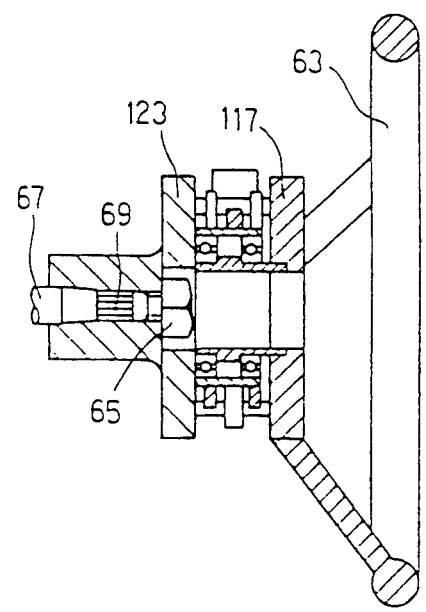
FIG. 21 is a schematic sectional view of FIG. 20.
Figure 22:
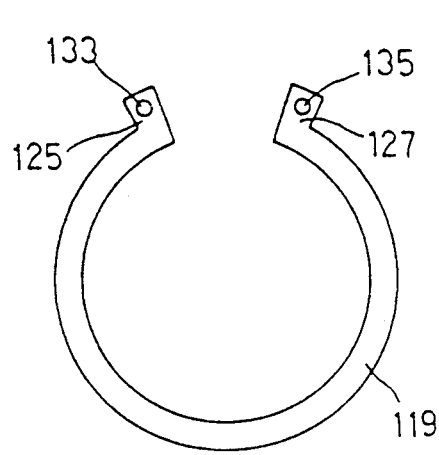
FIGS. 22 and 23 are views showing the shape of the torque transmitting means of the forth embodiment of the present invention.
Figure 23:
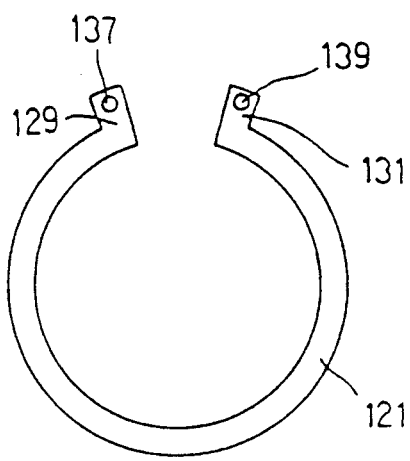
Figure 24:
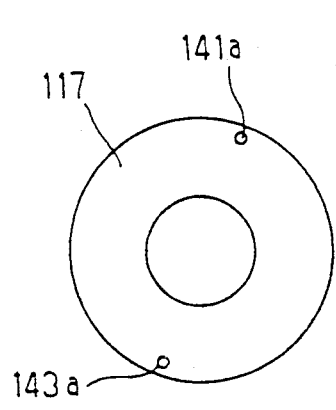
FIG. 24 to 26 are schematic views showing the combination of the steering wheel side support part, steering shaft side support part, and the torque transferring means in the forth embodiment of the present invention.
Figure 26:
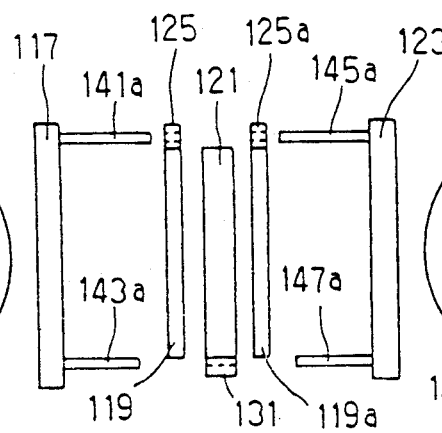
Figure 25:
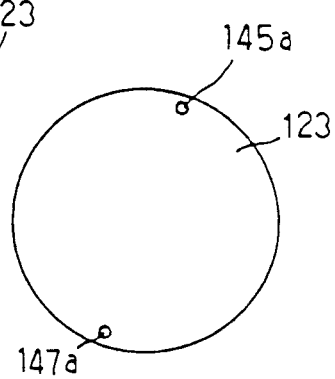

The forth embodiment of this invention will be explained with references to FIGS. 20 to 30. The same component as in the previous embodiments are given the same reference numerals, and their description will be omitted. FIG. 20 is a schematic view of a steering torque detecting device of this embodiment assembled in a steering wheel. FIG. 21 is a cross sectional view of the major portion. FIGS. 22 and 23 illustrate the elastic bodies used in this embodiment. They are of a ring form a part of which is cut off, and projections 125, 127, 129, and 131 where pin holes 133, 135, 137, and 139 are provided is formed at the both ends. FIGS. 24, 25, and 26 are schematic views illustrating the positional relation between the steering wheel side support part 117, the steering shaft side support part 123, and the elastic bodies 119, 121, and 119a of this embodiment. In this embodiment, the spring constant of the set of two elastic bodies 119 and 119a and that of the elastic body 121 are equal. In FIG. 26, a pin 141a of the steering wheel side support part 117 engages with both of the pin hole 135 of elastic body 119 and the pin hole 135 of elastic body 119a. A pin 145a of the steering shaft side support part 123 engages with both of the pin hole 133 of the elastic body 119 and the pin hole 133 of the elastic body 119a. In the elastic body 121, a pin 143a engages with both of the pin hole 139 of the elastic body 121. And a pin 147a engages with a pin hole 137 of elastic body 121.

Figure 27:
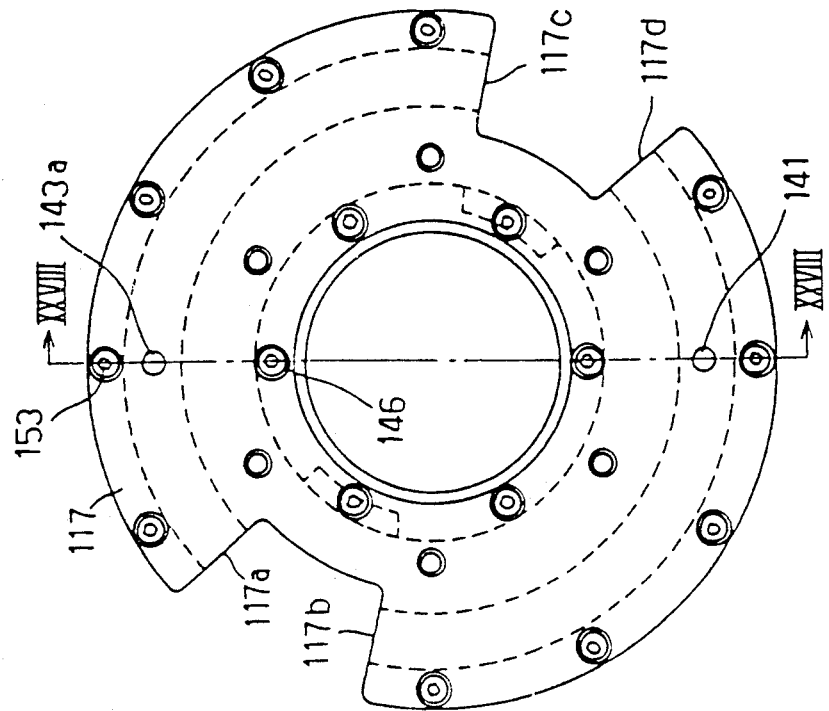
FIG. 27 is a plain view of the steering wheel side support part in the forth embodiment of the present invention.
Figure 28:
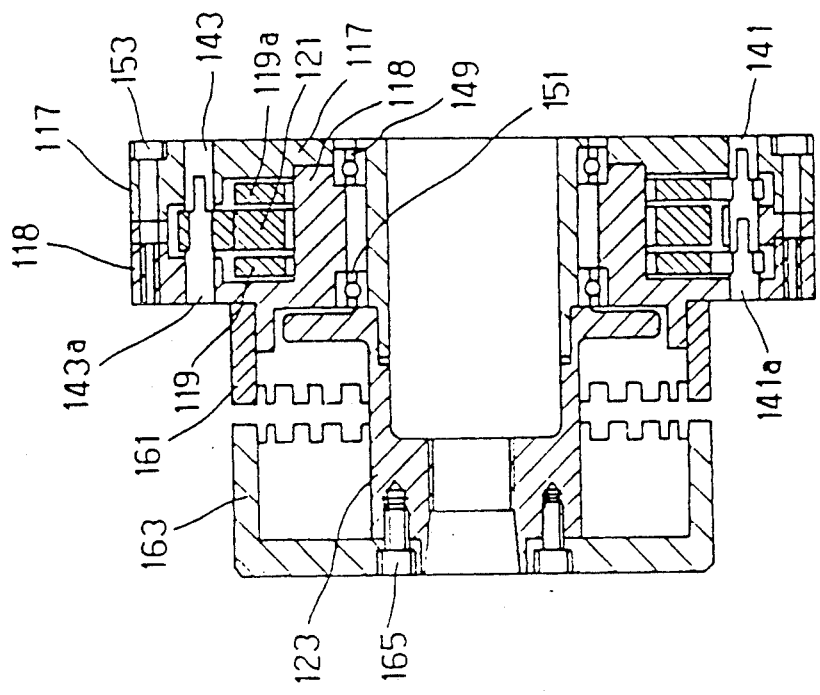
FIG. 28 is a sectional view taken along with XXVIII—XXVIII line of FIG. 27.
Figure 30:
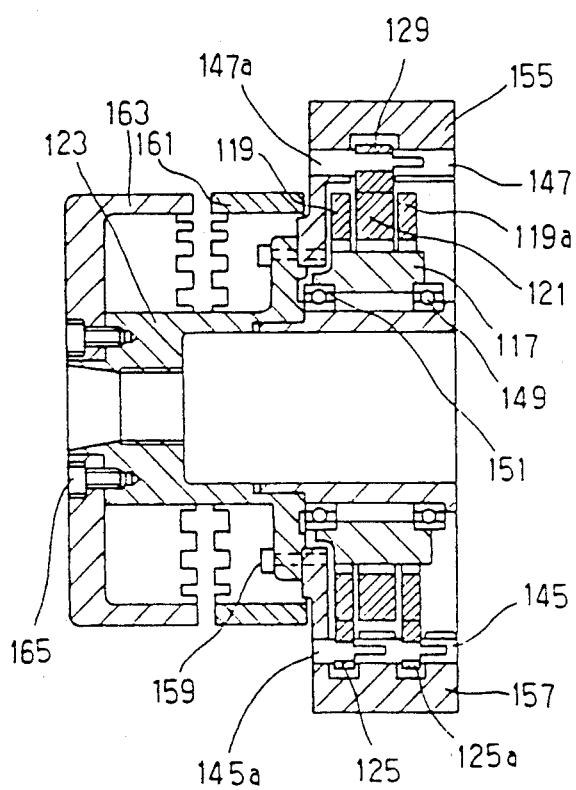
FIG. 30 is a sectional view taken along with XXX—XXX line of FIG. 29.
Figure 29:
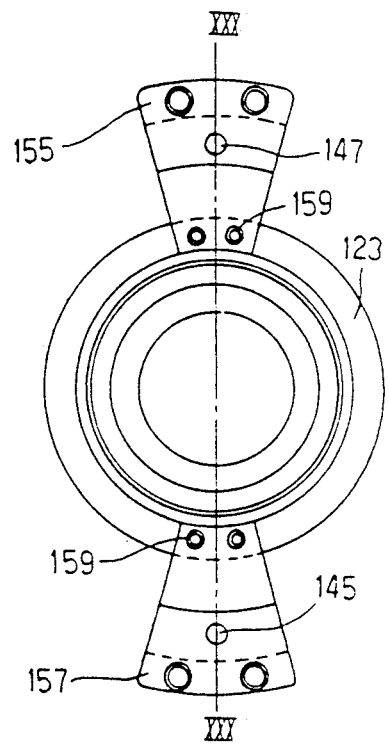
FIG. 29 is a plain view of the steering shaft side support part of the forth embodiment of the present invention.

Referring to FIGS. 27 to 30, this embodiment will be explained in detail. FIG. 27 is a plan view of the steering wheel side support part 117. The steering wheel side support part 117 is a doughnut-shape ring having stopper faces 117a, 117b, 117c, and 117d. FIG. 29 is a plan view of the steering shaft side support part 123. Projecting hook parts 155 and 157 are secured to the steering shaft side support part 123 by pins 159. In this embodiment, the steering wheel side support part 117 and steering shaft side support part 123 relatively rotate through bearings 149 and 151, and they are connected by the elastic bodies 119, 119a, and 121 to open the elastic bodies. FIG. 28 is a cross-sectional view of the steering torque detecting device of this embodiment taken along with XXVIII—XXVIII of FIG. 27. FIG. 30 is a cross sectional view taken along with XXX—XXX line of FIG. 29. In FIG. 28, the steering shaft side rotary member 163 is fastened to the steering shaft side support part 123 by pins 165. The steering wheel side rotary member 161 is fastened to the behind under side of the steering wheel side support part 118. The steering wheel side support part 117 and the steering wheel side support part 118 are joined to each other by hexagonal pins 146 and 153. As to the device shown in FIG. 28, when the steering wheel is turned, the steering wheel side support parts 117 and 118, the steering wheel side rotary member 161, the pin 143a and the pin 141a turn confidently. The turning force applied to the steering wheel side support part 117 is transmitted to the steering shaft side support part 123 through the pins 147a and 145a (shown in FIG. 30). As a result of the strain produced on the elastic bodies 119, 119a, and 121, the steering wheel side rotary member 161 and the steering shaft side rotary member 163 relatively rotate. The detection of the change in magnetic flux caused by the relative rotation is carried out in the same way as in the aforementioned first embodiment.

Because of the shape of the elastic bodies as mentioned above, Each elastic body 119, 119a, and 121 of this embodiment is so assembled that the initial strain is caused in the elastic bodies 119, 119a and 121, namely the elastic bodies 119, 119a and 121 are deformed when the pin 141a, 143a, 145a and 147a are inserted into the pin holes 133, 135, 137 and 139, therefore, the slack between the elastic bodies and the pins can be eliminated. The restoring force to the original position under the unloaded condition can be increased, and the necessity for adjusting the zero point is eliminated. Since the forces acting on the elastic bodies 119, 119a, and 121 are tensile stress, and since the shear strain acting thereon is smaller than the previous embodiment, it is possible to use small elastic bodies. Furthermore, the shift of rotation of the steering wheel side support part 117 and the steering shaft side support part 123 is limited stopped at the predetermined position where the projecting hook portion 155 or 157 strikes hits one of the stopper faces 117a, 117b, 117c, and 117d. Because, the shift of rotation does not continue beyond a specified position, the elastic bodies is protected from the damage due to the excessive torque input or the impacts.

Figure 32:
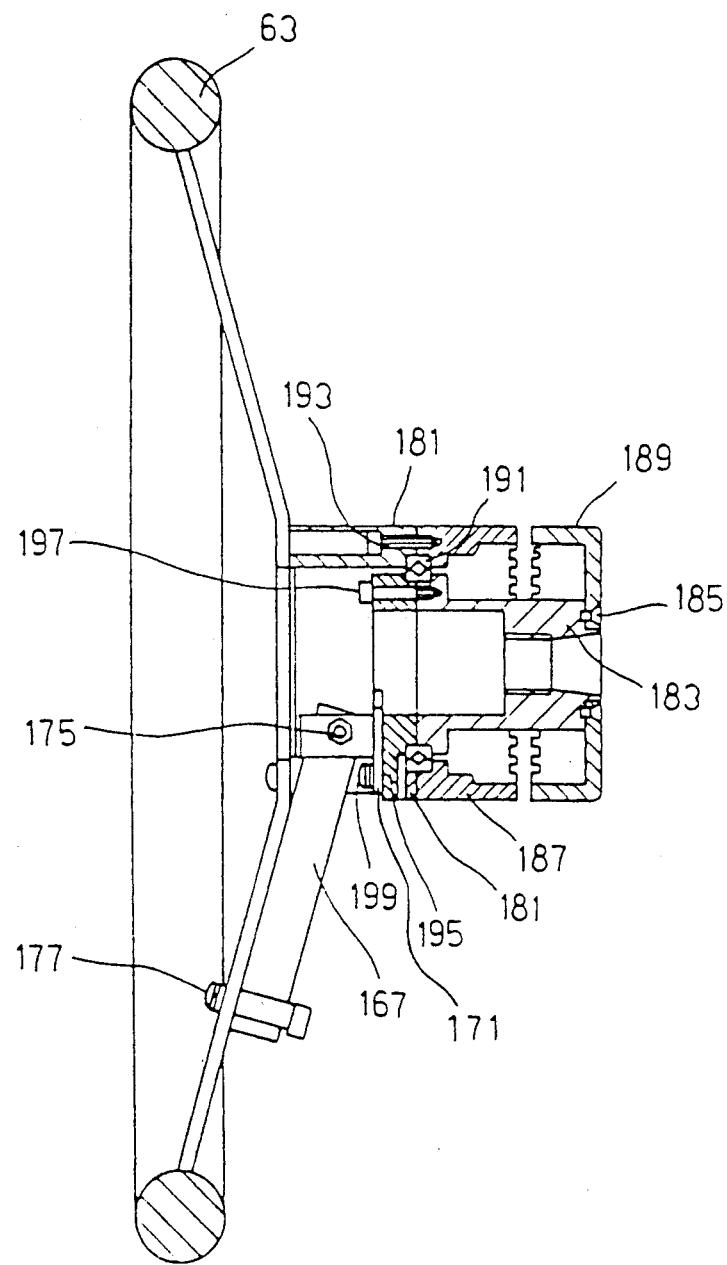
FIG. 32 is a schematic sectional view of FIG. 31.
Figure 33B:
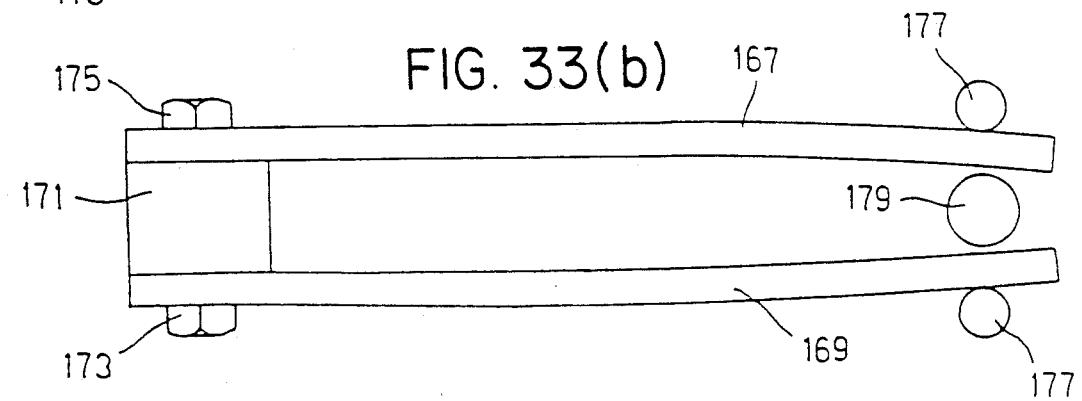

Referring to FIGS. 31 to 33, a fifth embodiment of the present invention will be explained. FIG. 31 is a schematic view of a steering torque detecting device of this embodiment assembled in a steering wheel part.

FIG. 32 is a sectional view of the major part thereof. In this embodiment, 2 types of plate-shape elastic bodies 167 and 169 having different spring constants are used. One end of the elastic bodies 167 and 169 is secured with bolts 173 and nuts 175 the interposing a spring securing member 171 therebetween, and other end is fastened to the steering wheel with pins 177 and 179. As shown in FIG. 32, the steering shaft side rotary member 189 is fastened to the steering shaft side support part 183 with pins 185. The steering shaft side support part 183 is secured to a disc 195 with bolts 197, the spring securing member 171 is connected to the disc 195 with bolts 199, and the elastic bodies 167 and 169 are fastened to the spring securing member 171 with the bolts 173 and nuts 175. The steering wheel side rotary member 187 is fastened to the steering wheel side support part 181 with pins 193. A bearing 191 is provided between the steering wheel side support part 181 and the steering shaft side support part 183. FIG. 33 shows the assembling conditions of the elastic bodies 167 and 169 where an initial strain has been provided and that where no initial strain has been provided. (a) part of FIG. 33 shows the condition before providing initial strain, and (b) part of FIG. 33 shows the condition after assembling with the initial strain provided. In this embodiment, when the steering wheel is turned and therefore the steering wheel side support part 181 and the steering wheel side rotary member 187 are turned, the elastic bodies 167 and 169 are distorted to transmit forces to the steering shaft side support part 183. As a result, the steering wheel side rotary member 187 and the steering shaft side rotary member 189 relatively rotate, and the change in magnetic flux caused by the relative rotation is detected by the same detecting means as in the first embodiment. In this embodiment, the elastic bodies 167 and 169 can be incorporated in the spork part of steering wheel, and the column part 201 of steering handle can be made hollow.

What is claimed is:

1. A steering torque detecting device for detecting a steering torque generated by turning a steering wheel comprising:

a steering wheel side rotary means which rotates with said steering wheel;

a steering shaft side rotary means which rotates with a steering shaft;

a plurality of torque transmitting means for transmitting said steering torque from said steering wheel side rotary means to said steering shaft side rotary means, said torque transmitting means being provided around a rotational center of said steering shaft, a first end of each of said torque transmitting means being connected to said steering wheel side rotary means, and a second end of each of said torque transmitting means being connected to said steering shaft side rotary means, each of said torque transmitting means having a bending part for bending in response to a rotation of one of said steering wheel side rotary means and said steering shaft side rotary means resulting in a relative rotation therebetween, said torque transmitting means having a longitudinal direction parallel to an axial direction of said steering wheel side rotary means and said steering shaft side rotary means; and a detecting means for detecting said relative rotation between said steering shaft side rotary means and said steering wheel side rotary means.

2. A steering torque detecting device according to claim 1, wherein said torque transmitting means are symmetrically positioned around said steering shaft.

3. A steering torque detecting device according to claim 1, wherein each torque transmitting means comprises an elastic plate located in such a manner that each elastic plate is in a plane perpendicular to a rotating direction of said steering shaft.

4. A steering torque detecting device according to claim 1, further comprising:
a rotation angle restricting means between said steering shaft side rotary means and said steering wheel side rotary means for restricting a maximum angle of said relative rotation between said steering shaft side rotary means and said steering wheel side rotary means.

5. A steering torque detecting device according to claim 1, wherein said torque transmitting means have a recess at said first and second ends for securing said torque transmitting means to said steering shaft side rotary means and said steering wheel side rotary means.

6. A steering torque detecting device according to claim 1, wherein said detecting means comprises:
at least one coil encircling said torque transmitting means.

7. A steering torque detecting device for detecting a steering torque generated by turning a steering wheel comprising:
a first steering shaft with a cylindrical shape for transmitting said steering torque to a wheel;
a rotary means with a cylindrical shape, wherein a top portion thereof is inserted in said first steering shaft;
a second steering shaft for transmitting said steering torque to said wheel, wherein a top portion thereof is inserted in said rotary means;
a connecting means for connecting said rotary means and said second steering shaft, wherein said connecting means disconnects said rotary means and said second steering means when a certain force is added to said connecting means;
a plurality of torque transmitting means for transmitting said steering torque from said steering wheel to said wheel, said torque transmitting means being provided around a rotational center of said steering shaft, a first end of each torque transmitting means being connected to said first steering shaft, a second end of each torque transmitting means being connected to said rotary means each torque transmitting means having a bending part for bending in response to a rotation of one of said first steering shaft and said rotary means resulting in a relative rotation therebetween, said torque transmitting means having a longitudinal direction parallel to an axial direction of said steering wheel side rotary means and said steering shaft side rotary means; and a detecting means for detecting said relative rotation between said first steering shaft and said rotary means.

8. A steering torque detecting device according to claim 7, wherein said torque transmitting means are symmetrically positioned around said steering shaft.

9. A steering torque detecting device according to claim 7, wherein each torque transmitting means comprises an elastic plate located in such a manner that each elastic plate is in a plane perpendicular to a rotating direction of said steering shaft.

10. A steering torque detecting device according to claim 7, further comprising:
a rotation angle restricting means between said rotary means and said first steering shaft for restricting a maximum angle of said relative rotation between said rotary means and said first steering shaft.

11. A steering torque detecting device according to claim 7, wherein said torque transmitting means have a recess at said first ends and second ends of said torque transmitting means for securing said torque transmitting means into said first steering shaft and said rotary means.

12. A steering torque detecting device for detecting a steering torque generated by turning a steering wheel comprising:
a steering wheel side rotary means which rotates with said steering wheel;
a steering shaft side rotary means which rotates with a steering shaft;
a plurality of torque transmitting means for transmitting said steering torque from said steering wheel side rotary means to said steering shaft side rotary means, said torque transmitting means being provided around a rotational center of said steering shaft, a first end of each of said torque transmitting means being connected to said steering wheel side rotary means, and a second end of each of said torque transmitting means being connected to said steering shaft side rotary means, each of said torque transmitting means having a bending part for bending in response to a rotation of one of said steering wheel side rotary means and said steering shaft side rotary means resulting in a relative rotation therebetween;
a detecting means for detecting said relative rotation between said steering shaft side rotary means and said steering wheel side rotary means;
at least one inner gear positioned between said steering side rotary means and said steering shaft side rotary means;
at least one outer gear positioned between said steering side rotary means and said steering shaft side rotary means; and wherein
a coil generates a magnetic circuit through said inner gear and outer gear and detects a change in magnetic field in said magnetic circuit produced by relative rotation between said steering wheel side rotary means and steering shaft side rotary means.

13. A steering torque detecting device according to claim 12, further comprising:
an electronic control unit for receiving output control signals from said coil to obtain a detected value of steering torque.

* * * * *